(12) United States Patent
Hoshino

(10) Patent No.: US 7,118,024 B1
(45) Date of Patent: Oct. 10, 2006

(54) ELECTRONIC DATA MANAGEMENT SYSTEM

(75) Inventor: Satoshi Hoshino, Yamanashi (JP)

(73) Assignee: NEC Corporation, Tokyo (JP)

( * ) Notice: Subject to any disclaimer, the term of this patent is extended or adjusted under 35 U.S.C. 154(b) by 251 days.

(21) Appl. No.: 09/590,686

(22) Filed: Jun. 9, 2000

(30) Foreign Application Priority Data

Jun. 10, 1999 (JP) .................................. 11-164179

(51) Int. Cl.
*G06F 17/00* (2006.01)

(52) U.S. Cl. ...................... 235/375; 235/376; 235/377; 235/378; 235/379; 235/380; 705/64; 705/65; 705/66; 705/67; 705/26; 707/104.1; 707/10

(58) Field of Classification Search ............ 705/64–67, 705/26; 235/375–380; 707/104.1, 10
See application file for complete search history.

(56) References Cited

U.S. PATENT DOCUMENTS

| | | | | |
|---|---|---|---|---|
| 4,907,268 A | * | 3/1990 | Bosen et al. ................. | 713/193 |
| 4,951,249 A | | 8/1990 | McClung et al. ............ | 364/900 |
| 4,993,068 A | * | 2/1991 | Piosenka et al. ............ | 713/186 |
| 5,146,499 A | | 9/1992 | Geffrotin .................... | 380/23 |
| 5,191,611 A | * | 3/1993 | Lang ........................... | 705/53 |
| 5,509,083 A | | 4/1996 | Abtahi et al. | |
| 5,948,103 A | * | 9/1999 | Fukuzaki ..................... | 713/200 |

FOREIGN PATENT DOCUMENTS

| | | |
|---|---|---|
| EP | 0 101 722 | 3/1984 |
| EP | 0 379 333 A1 | 7/1990 |
| EP | 0 878 780 A2 | 11/1998 |
| GB | 2 247 548 | 3/1992 |
| GB | 2 256 170 | 12/1992 |
| GB | 0 878 780 A2 * | 11/1998 |
| GB | 2 346 239 | 8/2000 |
| JP | 10-167048 A | 8/1985 |
| JP | 02-271466 A | 11/1990 |
| JP | 06-314226 A | 11/1994 |
| JP | 07-64911 A | 3/1995 |
| JP | 07-271884 A | 10/1995 |
| JP | 08-35861 A | 2/1996 |
| JP | 10-13403 A | 1/1998 |

(Continued)

OTHER PUBLICATIONS

Foon et al. "Bio-Discretization . . . " (17th Australian Joint Conference on Artificial Intelligence 2004). Retrieved from DIALOG.*
K. Nakamura et al., "Security Technologies for ETC", NEC Reports, NEC Creative, Ltd., vol. 50, No. 7, (Jul. 25, 1997), pp. 156-161.

(Continued)

*Primary Examiner*—James A Reagan
(74) *Attorney, Agent, or Firm*—Sughrue Mion, PLLC

(57) ABSTRACT

A user inserts a magnetic card to a magnetic card reader, and inputs his/her electronic signature and dealing data through an input device. The input dealing data are recorded on an electronic account data file together with the electronic signature. The input data are also recorded on a log file after encryption. An administrator inserts his/her IC card to an IC card reader/writer for updating the dealing data. The IC card reader/writer collaborates with a SAM to certify the inserted IC card (medium verification). A finger print recognizer obtains the administrator's finger print to compare it with finger print data stored in a finger print file (user verification). If both medium verification and user verification are passed, a controller decodes log data in the log file. After the log data are decoded, the administrator is allowed to access the electronic account data file for to update data. Data regarding to the update done by the administrator are also recorded on the log file after encyption.

26 Claims, 6 Drawing Sheets

FOREIGN PATENT DOCUMENTS

| | | |
|---|---|---|
| JP | 10-134229 A | 5/1998 |
| JP | 10-143556 A | 5/1998 |
| JP | 10-232967 A | 9/1998 |
| JP | 11-39483 A | 2/1999 |
| WO | WO 1998/55912 A1 | 12/1998 |
| WO | WO 00/48122 | 8/2000 |

OTHER PUBLICATIONS

K. Kouro, "Implementation of an Electronic File Encryption System/Signature", NTT Engineering Journal, Telecommunications Association, Ltd., vol. 10, No. 11, (Nov. 1, 1998), pp. 37-38.

Makoto Okazaki, "*Denshichouhou tokushuu*", Nikkei Windows NY, Nikkei Business Publication, Inc., Jan. 1, 1999, No. 22, pp. 171-178.

\* cited by examiner

DEAL INFO. 1 + ELECTRONIC SIGNATURE

DEAL INFO. 2 + ELECTRONIC SIGNATURE

.
.
.

DEAL INFO. N + ELECTRONIC SIGNATURE

| DATE | TIME | USER'S NAME | DEALINGS | AMOUNT | TERMINATION | UPDATED? | UPDATED ITEM |
|---|---|---|---|---|---|---|---|
| JAN. 01 | 12:00 | So-and-So | PAY | $100.00- | SUCCESSFUL (with ESIG) | NO | NONE |

FIG. 3

ELECTRONIC DATA MANAGEMENT SYSTEM

BACKGROUND OF THE INVENTION

1. Field of the Invention

The present invention relates to an electronic data management system and the like, suitable for managing electronic data such as electronic account data which require secure management.

2. Description of the Related Art

Any country has a law which decrees that business account documents regarding to dealings should be kept for a predetermined period. In Japan, a law which accepts electronic data files representing business accounts, have been effective since January 1999. Such the business account data require more secure management as compared to other ordinary electronic data files, because they must be protected from serious crimes such as tax evasion and misappropriation of public fund.

Verification by password has been a major way to certify a data administrator, however, it is not perfect protection because one who steals password can access the data easily. The business account data have required another new protection technique having improved security.

SUMMARY OF THE INVENTION

It is an object of the present invention to provide secure data management of electronic data such as an electronic account file.

To accomplish the above object, an electronic data management system according to a first aspect of the present invention is an electronic data management system which comprises a controller for executing a program stored in a memory while being connected to an input device for data input, storage units, and a data reader for reading data stored in a first recording medium, wherein the storage units comprise a first storage unit which stores an electronic data record file including electronic data, and a second storage unit which stores a log file including log data representing input or update log of the electronic data recorded on the electronic data record file, the input device inputs electronic data to be recorded on the electronic data record file, and update data to update the recorded electronic data, the controller executes the program stored in the memory to:

store log of the electronic data input from the input device in the log file;

store the electronic data input from the input device in the electronic data record file;

control the data reader to determine whether the first recording medium being accessed by the data reader is certified medium or not;

determine whether the system is operated by a certified operator based on externally given information;

allow the operator to input the update data through the input device to update the electronic data in the electronic data record file when the first recording medium and the operator are certified;

update the electronic data in the electronic data record file in accordance with the update data input by the input device; and store log of the update data input by the input device in the log file.

In the above system, the second storage unit may be detachably connected to the system.

In the above system, the first recording medium may be detachably connected to the data reader.

In the system, the first recording medium may store predetermined encryption keys. In this case, the system further comprises a medium verification unit which stores predetermined encryption keys, collaborates with the data reader to perform medium verification by the challenge-response with using the own encryption key and the encryption key read from the first recording medium, and informs the controller of the verification results.

In the above system, the controller may encrypt the log of the electronic data input by the input device with the predetermined encryption key, and store the encrypted data in the log file.

In this case, the controller decodes the encrypted log of the input electronic data stored in the log file with using a predetermined decode key when the controller certifies the first recording medium and the operator, and the system further comprises an output device which outputs the log of the input electronic data decoded by the controller.

The input device may input the update data in accordance with the log of the input electronic data output by the output device.

In the above system, the input device may also input verification information representing an operator who inputs the electronic data or the update data. In this case, the controller associates the verification information input by the input device with the input or updated electronic data before storing the electronic data in the electronic data record file.

In the above system, the storage units may further comprise a third storage unit which stores a physical characteristic data file including data representing physical characteristics of the certified operator. In this case, the system further comprises a data input device which inputs data representing the operator's physical characteristics, and a user verification unit which compares the physical characteristic data input by the data input device with the physical characteristic data stored in the physical characteristic data file, and determines whether the operator is the certified operator or not based on the comparison results.

In this case, the first recording medium may further store data relating to the physical characteristics of the certified operator, and the user verification unit compares the physical characteristic data input by the data input device with the physical characteristic data stored in the first recording medium, and determines whether the operator is the certified operator or not based on the comparison results.

The controller may act as the user verification unit by executing a program stored in the memory.

In the above system, the controller may store the electronic data stored by the input device in the electronic data record file immediately after the data input.

In the above system, the controller may store the electronic data in the electronic data record file based on the log of the electronic data stored in the log file when the controller certifies the first recording medium and the operator.

The above system according to the first aspect may further comprise a second data reader which reads data stored in a detachable second recording medium. In this case, the controller allows the input device to input the electronic data when the controller certifies the second recording medium based on the data read by the second data reader.

In the above system, the electronic data record file stores, for example, electronic account data. In this case, the electronic data and the update data may include information regarding to dealings and information for updating the dealing information to be recorded on the electronic account.

To accomplish the above object, an electronic data management system according to a second aspect comprises:

data input means for inputting electronic data;

electronic data recording means for recording information input by the data input means;

medium verification means for verifying a detachable recording medium when the recording medium is applied to the medium verification means;

user verification means for determining whether an operator is a certified one or not;

access authorization means for authorizing input of update data for updating the electronic data recorded on the electronic data recording means, when the medium verification means verifies the recording medium and the user verification means verifies the operator;

update data input means for inputting the update data when the access authorization means authorizes input of the update data;

data update means for updating the electronic data stored in the electronic data recording means in accordance with the update data input by the update data input means; and log management means for recording log of the electronic data input by the data input means and log of the update data input by the update data input means.

The above system may further comprise electronic data output means for outputting the log of the electronic data recorded on the log management means when the access authorization means authorizes the update data input.

In this case, the update data input means may input the update data in accordance with the electronic data output by the electronic data output means.

In the above system, the data input means may also input verification information representing who inputs the electronic data, and the update data input means may also input verification information representing who inputs the update data. In this case, the electronic data recording means associates the verification information representing who inputs the electronic data or the update data with the input electronic data or updated electronic data before recording the electronic data.

To accomplish the above object, a method according to a third aspect of the present invention is a method of managing electronic data which is applicable to a system comprising an electronic data record file for recording electronic data, and a log file for recording log of input or update of the electronic data to be recorded on the electronic data record file, the method comprises:

inputting the electronic data to be recorded on the electronic data record file;

storing log of the input electronic data in the log file;

recording the input electronic data on the electronic data record file;

discriminating whether a detachable recording medium is certified one or not when the recording medium is applied to the system;

discriminating whether a certified operator operates the system or not;

permitting input of update data for updating the electronic data recorded on the electronic data record file when the recording medium and the operator are certified;

inputting the update data after the permission;

updating the electronic data in the electronic data record file in accordance with the input update data; and storing log of the input update data in the log file.

In the above method, the permitting the update data input may output the log of the input electronic data stored in the log file In this case, the update data are input in accordance with the output electronic data.

In the above method, log of the input electronic data and the update data may be encrypted when storing the log of the input electronic data or the log of the input update data in the log file.

In this case, the log of the input electronic stored in the log file may be decoded when the recording medium and the operator are certified, to output the log data.

In the above method, the inputting the electronic data may also inputs verification information representing who input the electronic data, and the inputting the update data may also inputs verification information representing who inputs the update data.

In this case, the recording the electronic data on the electronic data record file associates the verification information representing who inputs the electronic data with the electronic data before recording the electronic data on the electronic data record file, and the recording the update data on the electronic data file associates the verification information representing who inputs the update data before recording the update data on the electronic data record file.

In the above method, the discriminating the certified operator may compare data representing physical characteristics of an operator with previously stored data representing physical characteristics of the certified operator.

In the above method, the recording the electronic data on the electronic data record file may record the electronic data immediately after the inputting the electronic data inputs the electronic data.

The recording the electronic data may record the electronic data on the electronic data record file when the discriminations certify the recording medium and the operator.

To accomplish the above object, a computer readable recording medium according to a third aspect of the present invention is a computer readable recording medium storing a program which causes a computer system comprising an electronic data record file for recording electronic data and a log file for storing log of input or updated electronic data to be recorded on the electronic data record file, the program comprises the steps of:

inputting the electronic data to be recorded on the electronic data record file;

storing log of the input electronic data in the log file;

recording the input electronic data on the electronic data record file;

discriminating whether a detachable recording medium is certified one or not when the recording medium is applied to the system;

discriminating whether a certified operator operates the system or not;

permitting input of update data for updating the electronic data recorded on the electronic data record file when the recording medium and the operator are certified;

inputting the update data after the permission;

updating the electronic data in the electronic data record file in accordance with the input update data; and storing log of the input update data in the log file.

By the program stored in the above recording medium, the electronic data input step may also input verification information representing who inputs the electronic data;

the update data input step may also input verification information representing who inputs the update data;

the electronic data recording step may associate the electronic data with the verification information representing who inputs the electronic data before recording the electronic data on the electronic data record file; and the update data recording step may associate the update data with the verification information representing who inputs the update data before recording the update data on the electronic data record file.

To accomplish the above object, a program data signal according to a fourth aspect of the present invention is a program data signal being embedded in a carrier wave, which represents a program for causing a computer system comprising an electronic data record file for recording electronic data and a log file for recording input or update log of the electronic data to be recorded on the electronic data record file, the program data signal comprises:

a segment for inputting the electronic data to be recorded on the electronic data record file;

a segment for recording log of the input electronic data on the log file;

a segment for recording the input electronic data on the electronic data record file;

a segment for discriminating whether a detachable recording medium is certified one or not when the recording medium is applied to the computer system;

a segment for discriminating whether an operator is a certified operator or not;

a segment for permitting input of update data for updating the electronic data recorded on the electronic data record file when the recording medium and the operator are certified;

a segment for inputting the update data when the update data input is permitted;

a segment for updating the electronic data recorded on the electronic data record file in accordance with the input update data; and a segment for storing log of the input update data in the log file.

In the program data signal, the electronic data input segment may also input verification information representing who inputs the electronic data, the update data input segment may also input verification information representing who inputs the update data, the electronic data recording segment may associate the verification information representing who inputs the electronic data with the electronic data before recording the electronic data on the electronic data record file, and the update data recording segment may associate the verification information representing who inputs the update data before recording the update data on the electronic data record file.

BRIEF DESCRIPTION OF THE DRAWINGS

These objects and other objects and advantages of the present invention will become more apparent upon reading of the following detailed description and the accompanying drawings in which:

FIG. 3 is a diagram showing data recorded on a log file shown in FIG. 1;

DETAILED DESCRIPTION OF THE PREFERRED EMBODIMENTS

A preferred embodiment of the present invention will now be described with reference to accompanying drawings.

Figure 1:
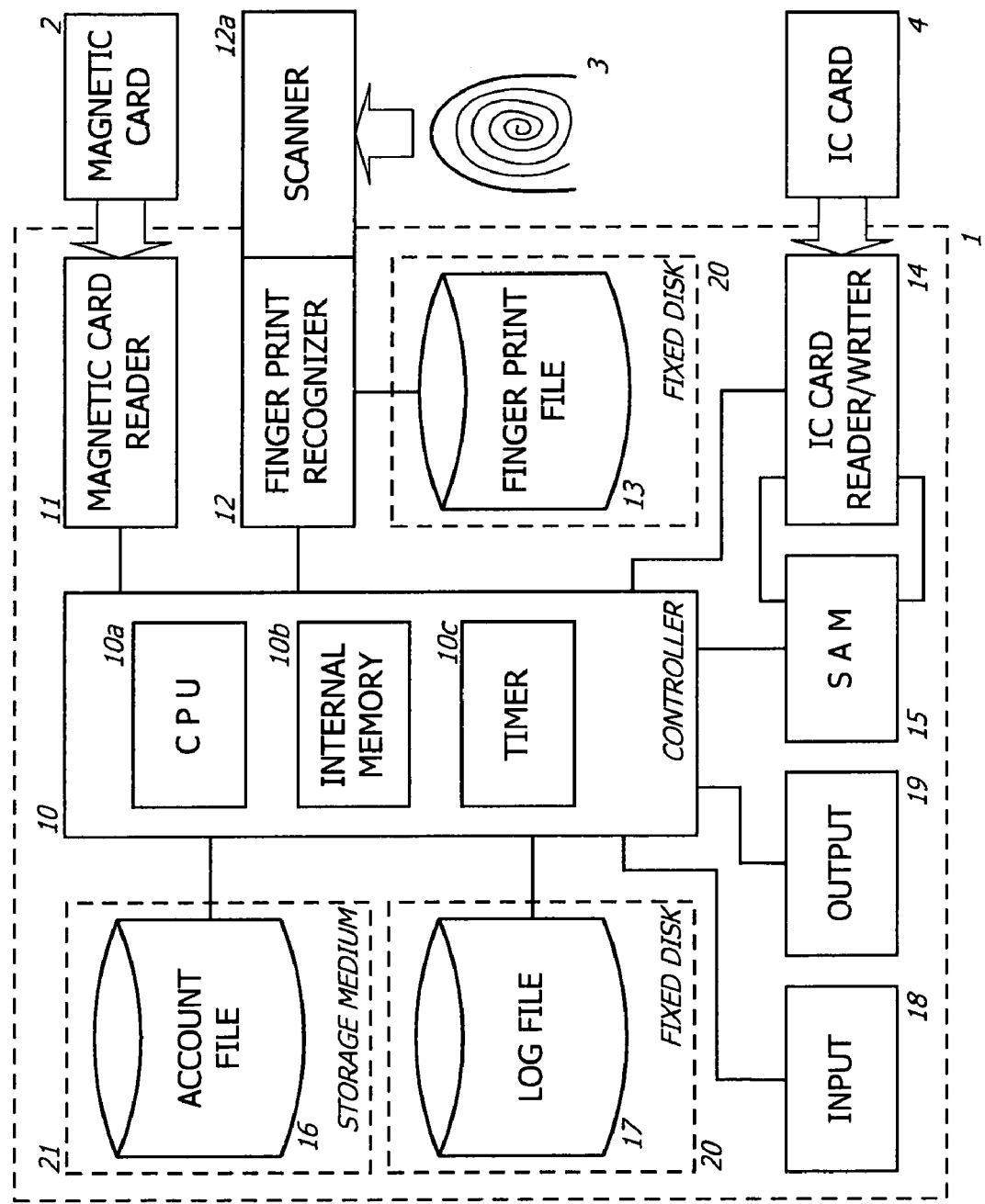
FIG. 1 is a block diagram showing the structure of an electronic account management system according to an embodiment of the present invention.

FIG. 1 is a block diagram showing the structure of an electronic account file management system according to the embodiment. As shown in FIG. 1, the system comprises an electronic account file manager 1 to which an input device 18 and an output device 19 are connected, and a magnetic card 2 and an IC (Integrated Circuit) card 4 which are detachable to the electronic account file manager 1. The system obtains data representing finger print 3 as the administrator's physical characteristics (described later in detail).

The magnetic card 2 is owned by a user who utilizes the system, that is, who operates the system to record his/her dealing data. More precisely, the user inserts the magnetic card 2 into a card reader 11 and inputs his/her dealing data through the input device 18. The IC card 4 is owned by the system administrator. The administrator inserts the IC card 4 into a reader/writer 14 and inputs command through the input device 18 to update and/or delete the dealing data. The IC card 4 previously stores data representing the administrator's finger print and predetermined cryptograph keys.

The electronic account file manager 1 is a special purpose computer or a customized general purpose computer. The electronic account file manager 1 comprises a controller 10 including a CPU (Central Processing Unit) 10a, an internal memory 10b and a timer 10c, a magnetic card reader 11, a finger print recognizer 12, an IC card reader/writer 14, a SAM (Secure Application Module) 15, fixed disks 20 storing a finger print file 13 and a log file 17, and a detachable recording medium 21 storing an electronic account file 16.

In the controller 10, the CPU 10a executes a program (described later) stored in the internal memory 10b to control the magnetic card reader 11, the finger print recognizer 12, the IC card reader/writer 14 and the SAM 15, and/or updates the contents of the electronic account file 16 and the log file 17. The controller 10 outputs to the output device 19 any result at any appropriate timing. The controller 10 records log on the log file 17 in accordance with time information counted by the timer 10c.

The magnetic card reader 11 reads data recorded on the magnetic card 2 inserted. When the reader 11 certifies the owner of the inserted card 2, the reader 11 informs the controller 10 of it.

The finger print recognizer 12 comprises a scanner 12a which scans the finger print 3, and performs pattern matching among the data representing the scanned finger print 3, finger print data stored in the finger print file 13, and finger print data read from the IC card 4. In a case where the data representing the scanned finger print 3 coincide with the finger print data in the finger print file 13 and the IC card 4, the finger print recognizer 12 verifies that the scanned finger print 3 is the administrator's finger print, and informs the controller 10 of it.

The finger print file 13 is prepared in the fixed disk 20 in the electronic account file manager 1. The finger print file 13 previously stores finger print(s) 3 of the administrator(s) of the electronic account file manager 1. In this case, the finger print(s) are scanned by the scanner 12a of the finger print recognizer 12. In order to prevent the data in the finger print file 13 from being falsified, the electronic account file manager 1 may employ a protection system which allows the administrator to access the finger print file 13 only when the IC card 4 inserted in the IC card reader/writer 14 is certified.

The IC card reader/writer 14 reads data on the IC card 4 inserted. The IC card reader/writer 14 collaborate with the SAM 15 to perform verification procedure (described later). When the verification is successful, the IC card reader/writer 14 informs the controller 10 of it. The IC card reader/writer 14 is also applicable to writing finger print data and cryptograph keys on the IC card 4.

The SAM 15 is, for example, a single chip semiconductor device. The SAM 15 stores cryptograph keys (private key and public key). The SAM 15 collaborates with the IC card reader/writer 14 to perform verification by challenge-response technique utilizing the cryptograph keys in the SAM 15 and the IC card 4 when the IC card 4 is inserted in the IC card reader/writer 14.

Figures 2, 4:
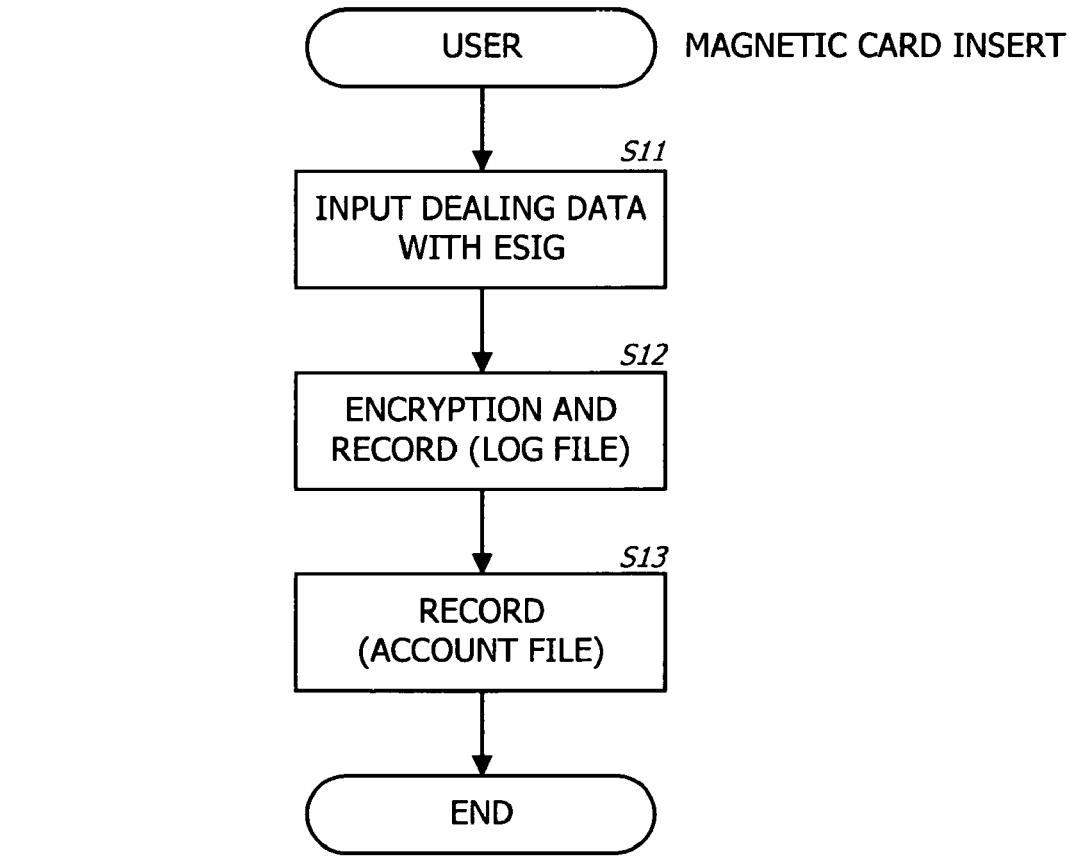
FIG. 2 is a diagram showing data recorded on an electronic account file shown in FIG. 1.
FIG. 4 is a flowchart showing a process flow when a user inputs dealing data.

The electronic account file 16 is prepared on a detachable rewritable storage medium 21 such as MO, CD-R, and DVD. As shown in FIG. 2, the electronic account file 16 stores data sets regarding to dealings and associated user's name who input the data set. In the electronic account file 16, electronic signature (ESIG) represents the user's names. Data recording on the electronic account file 16 may be done at every dealings, or may be batched in accordance with the log data in the log file 17.

The log file 17 is prepared in the fixed disk 20 in the electronic account file manager 1. The log file 17 stores log data relating to dealings and data update (hereinafter data update includes data deleting). FIG. 3 shows records in the log file 17, that is, "date", "time", "user's name", "dealings", "amount", "termination" flag, "update" flag, and "updated items".

The log file 17 stores the log data record by record each time the user inputs dealing data and the administrator updates the data. The log data are encrypted by the public key in the SAM 15. Only the administrator is allowed to decode the log data by using the private key in the SAM 15.

The input device 18 may be a keyboard or the like operated by the user and the administrator to input dealing data and any commands. The output device 19 may be a display or the like which displays requested results output by the controller 10, for example, it displays decoded log data in the log file 17 when the administrator updates the electronic account file 16.

How the electronic account managing system manages the electronic account file 16 will now be described. As conditions for the following explanation, dealing data will be recorded on the electronic account file 16 each time the dealing is done, and data representing the administrator's finger print 3 has been previously stored in the finger print file 13 and the IC card 4 owned by the administrator before using the system.

FIG. 4 is a flowchart showing steps for inputting dealing data by the user. The process flow starts after the magnetic card reader 11 informs the controller 10 that the magnetic card 2 inserted to the reader 11 and its user are verified.

The user operates the input device to input dealing data and his/her electronic signature (ESIG) (step S11). The controller 10 affixes date and time obtained by the timer 10c and user's name to the input dealing data, thus, 1 record of log data is prepared. Then the controller 10 fetches the public key from the SAM 15 to encrypt the prepared 1 record data, and stores it on the log file 17 (step S12).

The controller 10 associates the input dealing data with the user's electronic signature and stores them on the electronic account file 16 (step S13). Then, the process flow is terminated.

Figure 5:
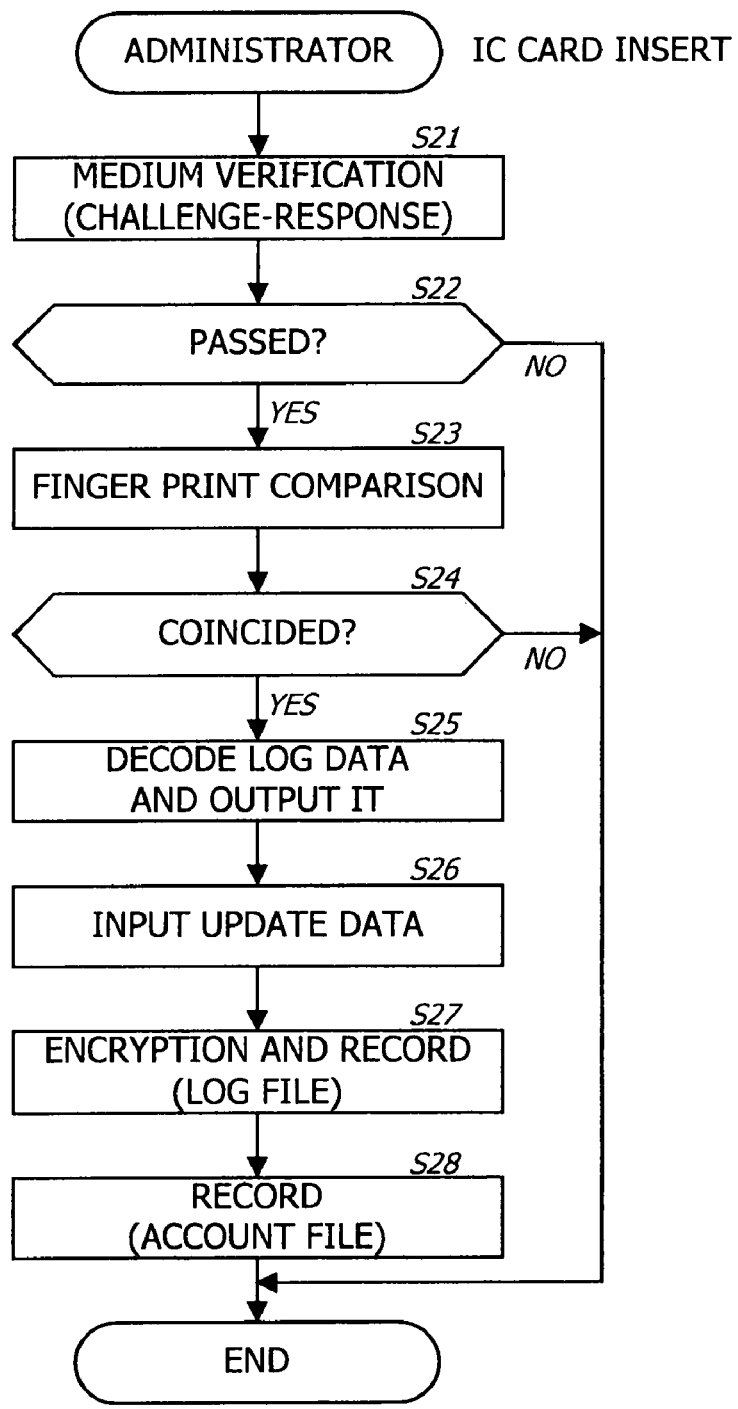
FIG. 5 is a flowchart showing a process flow when an administrator updates the dealing data.

FIG. 5 is a flowchart showing steps for updating the dealing data by the administrator. This process flow starts after the administrator inserts his/her IC card 4 to the IC card reader/writer 14.

The IC card reader/writer 14 collaborates with the SAM 15 to perform certification by challenge-response technique with using the cryptograph keys in the inserted IC card 4 and the SAM 15 to certify the IC card 4 (step S21). The controller 10 determines whether the certification is successful or not based on information from the IC card reader/writer 14 representing the certification results (step S22).

If the certification successful, the controller 10 controls the finger print recognizer 12 to perform finger print comparison. That is, the finger print recognizer 12 drives the scanner 12a to scan the finger print 3. The finger print recognizer 12 compares finger print data representing scanned finger print 3, finger print data in the IC card 4 read by the IC card reader/writer 14, and finger print data stored in the finger print file 13 by pattern matching technique. The finger print recognizer 12 compares pattern data of the three finger print data sets (step S23). Then, the controller 10 discriminates whether the compared three finger print data sets coincide with each other or not based on information from the finger print recognizer 12 representing the comparison results (step S24).

If the three finger print data sets coincide with each other, the controller 10 fetches the private key from the SAM 15 to decode the log data in the log file 17. The controller 10 controls the output device 19 to display the decoded log data (step S25). Once the log data are displayed on the output device 19, the administrator is allowed to update the log data. Then, the administrator operates the input device 18 to update the log data and input the administrator's electronic signature (step S26).

The controller 10 affixes date and time obtained by the timer 10c and user's name to the updated data, thus, 1 record of log data is prepared. Then, the controller 10 fetches the public key from the SAM 15 to encrypt the updated 1 record of data, and stores it in the log file 17 (step S27).

The controller 10 updates the data in the electronic account file 16 in accordance with the data updated at step S26, and associates the electronic signature input at step S26 with the updated account data (step S28). And, the process flow is terminated.

If the certification was unsuccessful at step S22, or if the finger print data sets did not coincide with each other at step S24, the controller 10 terminates the process flow immediately.

The system according to the embodiment features the following four ways to realize the secure data management.

(1) Unless the administrator passes both medium verification and user verification, the administrator can not update the data in the electronic account file 16. That is, the system requires verification with the IC card 4 and verification with finger print 3. Such the dual verification realizes more effective data protection as compared to the conventional verification by password, because it is very difficult for persons other than the administrator to alter the data in the electronic account file 16.

(2) The administrator verification with the scanned finger print 3 further requires dual verification, that is, pattern matching with the finger print data in the finger print file 13 and with the finger print data in IC card 4. This structure prevents the electronic account file 16 from being illegally altered in a case where the finger print file in the finger print file 13 are falsified, or where the IC card 4 is illegally copied.

(3) Electronic signatures are affixed to the records in the electronic account file 16 for clarifying who inputs and updates the record. This structure reveals illegal data alteration by uncertified person.

(4) The log data in the log file 17 are encrypted by the public key in SAM 15. The administrator is allowed to decode the log data only when the administrator passes both medium verification and administrator verification. Therefore, only the administrator is allowed to read and update the log data in the log file 17.

Accordingly, the system according to this embodiment realizes secure data management because unregistered person hardly access the electronic account file 16 to alter the data. Moreover, it is very difficult for unregistered persons to read the log file 17. This feature also improves secure data management for the electronic account file 16.

In the above embodiment, the finger print 3 has been employed as physical characteristic for certifying the administrator. The present invention may employ various other physical characteristics for the administrator verification such as the iris, hand shape, facial characteristics, vocal characteristics, and the retina. The password verification may be employed in addition to or instead of the verification with the physical characteristics.

The controller 10 may perform the finger print pattern matching by executing a program prepared in the internal memory 10b. In this case, the scanner 12a and the finger print file 13 may be external (peripheral) devices detachably connected to the controller 10.

The IC card 4 may store the keys for encrypting and decoding the log data in the log file 17, instead of the SAM 15.

In the above embodiment, the input data are recorded on the electronic account file 16 immediately. Instead of this structure, only the administrator may be allowed to record the input data on the electronic account file 16. In this case, the process flow shown in FIG. 4 is terminated at step S12 (step S13 is unnecessary).

Figure 6:
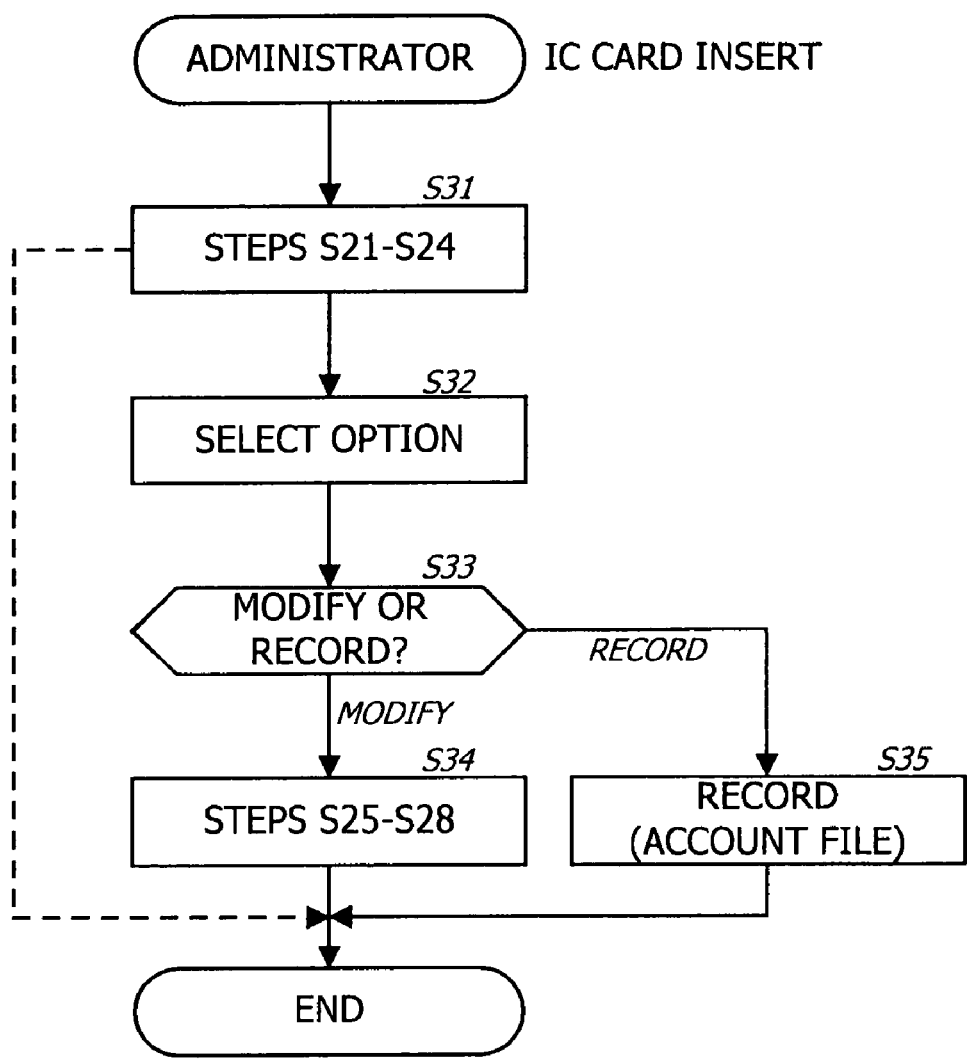
FIG. 6 is a flowchart showing a process flow when data recording on the electronic account file is done by the administrator solely.

FIG. 6 is an additional flowchart shoring a process flow in a case where the system employs the above described structure. In this case, the process flow starts after the administrator inters the IC card 4 to the IC card reader/writer 14.

After execution of steps S21 to S24 shown in FIG. 5 (step S31), the administrator operates the input device 18 to select options, dealing data update or data recording (step S32). The controller 10 determines which option was selected (step S33).

If the data update was selected, steps S25 to S28 shown in FIG. 5 are executed (step S34). And, the process flow is terminated. On the contrary, if the data recording was selected, the controller 10 fetches the private key from the SAM 15 to decode the log data in the log file 17. Of the decoded records, the controller select records representing dealing data (or updated data) which have not been recorded on the electronic account file 16, and records them with associating the administrators electronic signature therewith on the electronic account file 16. And, the process flow is terminated.

According to this structure in accordance with the process flow shown in FIG. 6, the data recording on the electronic account file 16 is done by the administrator. Therefore, this updated embodiment realizes more secure data management as compared to the above described original embodiment.

The present invention may be applicable not only to managing the electronic account file 16 and the log file 17 featured in the above embodiments, but also to various electronic data managements. The present invention is effective in managing data which should be strongly protected from data stealing or falsification as well as the electronic account data.

In the above embodiments, the CPU 10a executes the program stored in the internal memory 10b to execute the process flow shown in FIGS. 4, 5, and 6. The program may be stored in a computer readable recording medium.

Figure 7A:
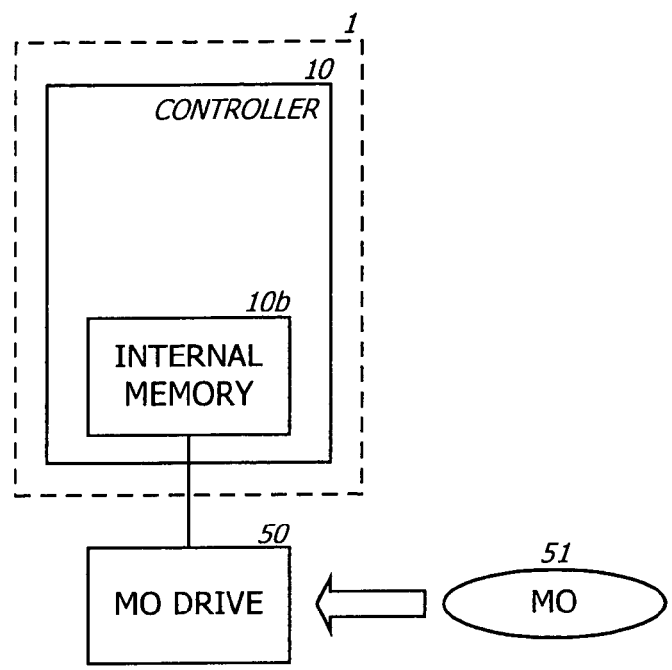
FIGS. 7A and 7B are block diagrams schematically showing updated electronic account management systems according to modified embodiments of the present invention.
Figure 7B:
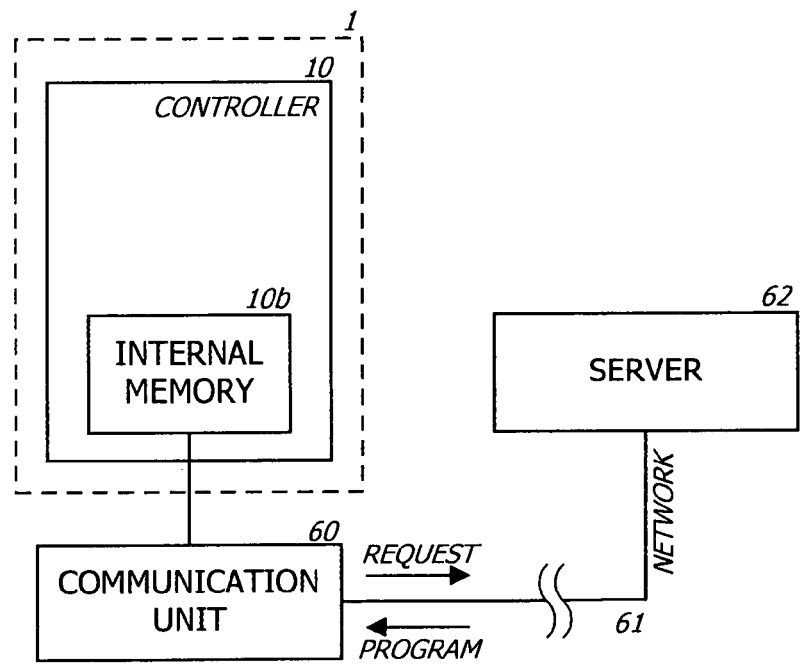

FIGS. 7A and 7B exemplifies cases of the separate program structure. FIG. 7A exemplifies a case where the program is stored in MO (Magneto-optical disk) 51. In this case, an MO drive 50 reads the program from the MO 51 and transfers it to the internal memory 10b in the controller 10. FIG. 7B exemplifies another case where the program is stored in a remote server 62. In this case, the system comprises a communication unit 60 which is connected to a network 61 to communicate with the server 62. The communication unit 60 request the server 62 via the network 61 to send a program data signal in which the program is embeded in a carrier wave signal. The communication unit 61 receives the program signal and transfers it to the internal memory 10b in the controller 10. FIGS. 7A and 7B do not show detailed illustration of the electronic account file manager 1, but it has the same structure as described in the above embodiments.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-164179 filed on Jun. 10, 1999 and including specification, claims, drawings and summary. The disclosure of the above Japanese Patent Application is incorporated herein by reference in its entirety.

What is claimed is:

1. An electronic data management system which comprises a controller for executing a program stored in a memory while being connected to an input device for data input, storage units, a data reader for reading data regarding an encryption key and physical characteristics of an operator stored in a first recording medium, a medium verification device which stores an encryption key for verifying said first recording medium, and a physical characteristic data obtaining unit, wherein said storage units comprise a first storage unit which stores an electronic data record file including electronic data, a second storage unit which stores a log file including log data representing an input or update log of the electronic data recorded on said electronic data record file, and a third storage unit which stores a physical characteristic data file which pre-stores data on physical characteristics of a certified operator, said input device inputs electronic data to be recorded on said electronic data record file, and update data to update the recorded electronic data, said medium verification device verifies whether said first recording medium from which said data reader has read data is a certified medium or not based on said encryption keys of both of said first recording medium and said medium verification device, said controller executes the program stored in said memory to:

store log of the electronic data input from said input device in the log file;

store the electronic data input from said input device by affixing thereto an electronic signature in the electronic data record file;

determine that said system is operated by a certified operator only when said medium verification device verifies that said first recording medium is a certified medium, and all three of the data on physical characteristics of an operator obtained by said physical characteristic data obtaining unit, the data regarding the physical, characteristics of an operator which said data reader has read from said first recording medium, and the data on the physical characteristics stored in said third storage unit, correspond to one another, allow the operator to input the update data through said input device to update the electronic data in the electronic data record file when said first recording medium and the operator are certified;

update the electronic data in the electronic data record file by affixing thereto an electronic signature in accordance with the update data input by said input device; and store log of the update data input by the input device in the log file.

2. The system according to claim 1, wherein said second storage unit is detachably connected to said system.

3. The system according to claim 1, wherein said first recording medium is detachably connected to said data reader.

4. The system according to claim 1, wherein, said first recording medium stores predetermined encryption keys, and said system further comprises a medium verification unit which stores predetermined encryption keys, collaborates with said data reader to perform medium verification by challenge-response by using its own encryption key and an encryption key read from said first recording medium, and informs said controller of the verification results.

5. The system according to claim 1, wherein said controller encrypts the log of the electronic data input by said input device with the predetermined encryption key, and stores the encrypted data in the log file.

6. The system according to claim 5, wherein said controller decodes the encrypted log of the input electronic data stored in the log file by using a predetermined decode key when said controller certifies said first recording medium and the operator, and said system further comprises an output device which outputs the log of the input electronic data decoded by said controller.

7. The system according to claim 6, wherein said input device inputs the update data in accordance with the log of the input electronic data output by said output device.

8. The system according to claim 1, wherein said input device also inputs verification information representing an operator who inputs the electronic data or the update data, and said controller associates the verification information input by said input device with the input or updated electronic data before storing the electronic data in the electronic data record file.

9. The system according to claim 1, wherein said controller acts as said user verification unit by executing a program stored in said memory.

10. The system according to claim 1, wherein said controller stores the electronic data stored by said input device in the electronic data record file immediately after the data input.

11. The system according to claim 1, wherein said controller stores the electronic data in the electronic data record file based on the log of the electronic data stored in the log file when said controller certifies said first recording medium and the operator.

12. The system according to claim 1 further comprising a second data reader which reads data stored in a detachable second recording medium, wherein said controller allows said input device to input the electronic data when said controller certifies said second recording medium based on the data read by said second data reader.

13. The system according to claim 1, wherein the electronic data record file stores electronic account data, and the electronic data and the update data include information regarding to transactions and information for updating the transaction information to be recorded on the electronic account.

14. An electronic data management system comprising:

data input means for inputting electronic data;

electronic data recording means for recording information input by said data input means by affixing thereto an electronic signature;

medium reading means for reading data regarding an encryption key and physical characteristics of an operator stored in a detachable recording medium;

medium verification means for verifying said recording medium when said recording medium is applied to said medium verification means, based on an encryption key pre-stored in said medium verification means and the encryption key read by said medium reading means;

physical characteristic data storage means for pre-storing data relating to physical characteristics of a certified operator;

physical characteristic data obtaining means for obtaining data relating to physical characteristics of a certified operator;

user verification means for determining that an operator is certified when all three of the data relating to the physical characteristics of the operator obtained by said physical characteristic data obtaining means, the data regarding the physical characteristics of an operator which said medium reading means has read from said recording medium, and the data relating to the physical characteristics stored in said physical characteristic data storage means correspond to one another;

access authorization means for authorizing input of update data for updating the electronic data recorded on said electronic data recording means, when said medium verification means verifies said recording medium and said user verification means verifies the operator;

update data input means for inputting the update data when said access authorization means authorizes input of the update data;

data update means for updating the electronic data stored in said electronic data recording means by affixing thereto an electronic signature in accordance with the update data input by said update data input means; and log management means for recording log of the electronic data input by said data input means and log of the update data input by said update data input means.

15. The system according to claim 14 further comprising electronic data output means for outputting the log of the electronic data recorded on said log management means when said access authorization means authorizes the update data input, wherein said update data input means inputs the update data in accordance with the electronic data output by said electronic data output means.

16. The system according to claim 14, wherein said data input means also inputs verification information representing who inputs the electronic data, said update data input means also inputs verification information representing who inputs the update data, and said electronic data recording means associates the verification information representing who inputs the electronic data or the update data with the input electronic data or updated electronic data before recording the electronic data.

17. A method of managing electronic data which is applicable to a system comprising an electronic data record file for recording electronic data, and a log file for recording log of input or update of the electronic data to be recorded on the electronic data record file, said method comprising:

inputting the electronic data to be recorded on the electronic data record file;

storing log of the input electronic data in the log-file;

recording the input electronic data by affixing thereto an electronic signature on the electronic data record file;

reading data regarding an encryption key and physical characteristics of an operator stored in a detachable recording medium;

discriminating whether said recording medium is certified when said recording medium is applied to said system, based on a pre-stored encryption key and the encryption key read from said recording medium;

obtaining data relating to physical characteristics of an operator, and discriminating that a certified operator operates said system when all three of the obtained data relating to the physical characteristics of an operator, the pre-stored data relating to physical characteristics of the certified operator, and the data regarding the physical characteristics of an operator read from said recording medium correspond to one another;

permitting input of update data for updating the electronic data recorded on the electronic data record file when the recording medium and the operator are certified;

inputting the update data after the permission;

updating the electronic data in the electronic data record file by affixing thereto an electronic signature in accordance with the input update data; and storing log of the input update data in the log file.

18. The method according to claim 17, wherein said permitting input of update data outputs the log of the input electronic data stored in the log file, and the update data are input in accordance with the output electronic data.

19. The method according to claim 17 further comprising encrypting log of the input electronic data and the update data when storing the log of the input electronic data or the log of the input update data in the log file.

20. The method according to claim 19 further comprising decoding the log of the input electronic stored in the log file when the recording medium and the operator are certified, and outputting the decoded log data.

21. The method according to claim 17, wherein said inputting the electronic data also inputs verification information representing who input the electronic data, said inputting the update data also inputs verification information representing who inputs the update data, said recording the electronic data on the electronic data record file associates the verification information representing who inputs the electronic data with the electronic data before recording the electronic data on the electronic data record file, and said recording the update data on the electronic data file associates the verification information representing who inputs the update data before recording the update data on the electronic data record file.

22. The method according to claim 17, wherein said discriminating the certified operator compares data representing physical characteristics of an operator with previously stored data representing physical characteristics of the certified operator.

23. The method according to claim 17, wherein said recording the electronic data on the electronic data record file records the electronic data immediately after said inputting the electronic data inputs the electronic data.

24. The method according to claim 17, wherein said recording the electronic data records the electronic data on the electronic data record file when said discriminations certify said recording medium and the operator.

25. A computer readable recording medium storing a program which causes a computer system comprising an electronic data record file for recording electronic data and a log file for storing log of input or updated electronic data to be recorded on the electronic data record file, said program comprising the steps of:

inputting the electronic data to be recorded on the electronic data record storing log of the input electronic data in the log file;

storing log of the input electronic data in the log-file;

recording the input electronic data by affixing thereto an electronic signature on the electronic data record file;

reading data regarding an encryption key and physical characteristics of an operator stored in a detachable recording medium;

discriminating whether said recording medium is certified when said recording medium is applied to said system, based on a pre-stored encryption key and the encryption key read from said recording medium;

obtaining data relating to physical characteristics of an operator, and discriminating that a certified operator operates said system when all three of the obtained data relating to the physical characteristics of an operator, the pre-stored data relating to physical characteristics of the certified operator, and the data regarding the physical characteristics of an operator read from said recording medium correspond to one another;

permitting input of update data for updating the electronic data recorded on the electronic data record file when the recording medium and the operator are certified;

inputting the update data after the permission;

updating the electronic data in the electronic data record file by affixing thereto an electronic signature in accordance with the input update data; and storing log of the input update data in the log file.

26. The recording medium according to claim 25, wherein said electronic data input step also inputs verification information representing who inputs the electronic data;

said update data input step also inputs verification information representing who inputs the update data;

said electronic data recording step associates the electronic data with the verification information representing who inputs the electronic data before recording the electronic data on the electronic data record file; and said update data recording step associates the update data with the verification information representing who inputs the update data before recording the update data on the electronic data record file.

* * * * *